United States Patent [19]
Sun et al.

[11] Patent Number: 5,901,330
[45] Date of Patent: May 4, 1999

[54] IN-CIRCUIT PROGRAMMING ARCHITECTURE WITH ROM AND FLASH MEMORY

[75] Inventors: Albert C. Sun, Taipei; Chang-Lun Chen, Hsinchu; Chee-Horng Lee, Taipei, all of Taiwan

[73] Assignee: Macronix International Co., Ltd., Taiwan

[21] Appl. No.: 08/818,389

[22] Filed: Mar. 13, 1997

[51] Int. Cl.⁶ .............................. G06F 12/06; G06F 13/20
[52] U.S. Cl. ................... 395/828; 395/681; 395/800.37; 711/103
[58] Field of Search ............................. 395/181, 800.37, 395/828, 183.12, 681, 282, 182.11, 290, 309, 833, 800.73; 711/103; 365/185.22, 185.08, 185.09, 185.29, 185.24

[56] References Cited

U.S. PATENT DOCUMENTS

| | | | |
|---|---|---|---|
| 5,018,096 | 5/1991 | Aoyama | 340/825.31 |
| 5,163,147 | 11/1992 | Orita | 364/DIG. 1 |
| 5,276,839 | 1/1994 | Robb et al. | 395/425 |
| 5,278,976 | 1/1994 | Wu | 364/DIG. 1 |
| 5,404,494 | 4/1995 | Garney | 364/DIG. 1 |
| 5,444,664 | 8/1995 | Kuroda et al. | 368/189.09 |
| 5,444,861 | 8/1995 | Adamec et al. | 364/DIG. 2 |
| 5,467,286 | 11/1995 | Pyle et al. | 364/483 |
| 5,495,593 | 2/1996 | Elmer et al. | 395/430 |
| 5,564,032 | 10/1996 | Aota et al. | 395/430 |
| 5,574,926 | 11/1996 | Miyazawa et al. | 395/800 |
| 5,579,479 | 11/1996 | Plum | 345/188.01 |
| 5,581,723 | 12/1996 | Hasbun et al. | 364/DIG. 1 |
| 5,603,056 | 2/1997 | Totani | 395/828 |

OTHER PUBLICATIONS

International Application No. PCT/US96/17302, filed Oct. 28, 1996, [Attorney Docket No. 17538–870] "Processor with Embedded In–Circuit Programming Structures," Macronix International Co., Ltd.

*Primary Examiner*—Daniel H. Pan
*Attorney, Agent, or Firm*—Wilson Sonsini Goodrich & Rosati

[57] ABSTRACT

An architecture for an integrated circuit with in-circuit programming includes a microcontroller on an integrated circuit and one or more banks of non-volatile memory which store instructions, including an in-circuit programming (ICP) set of instructions. Using a control program stored on the device, the device interactively establishes an in-circuit programming exchange with a device external to the integrated circuit and uses data obtained in the exchange to update software for the microcontroller. Portions of the ICP code which are likely to change between different application environments are stored in reprogrammable flash memory cells. Other portions of the ICP code, which are not likely to change between different application environments, are stored in space-efficient mask ROM memory cells. In this way, the ICP system can be flexibly adapted to different application environments, while conserving on silicon area occupied the ICP system.

48 Claims, 6 Drawing Sheets

IN-CIRCUIT PROGRAMMING ARCHITECTURE WITH ROM AND FLASH MEMORY

CROSS-REFERENCE TO RELATED APPLICATION

This application is related to International Application No. PCT/US96/17302, entitled PROCESSOR WITH EMBEDDED IN-CIRCUIT PROGRAMMING STRUCTURES, filed Oct. 28, 1996 by applicants Macronix International Co., Ltd., for all states other than the United States, and Albert C. Sun, Chee H. Lee and Chang L. Chen for the United States.

COPYRIGHT NOTICE PURSUANT TO 37 C.F.R. 1.71(e)

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

1. Field of the Invention

The present invention relates to integrated circuits having a non-volatile memory for storing sequences of instructions for execution by a microcontroller on the integrated circuit, and more particularly to techniques for accomplishing in-circuit programming to update and modify stored sequences of instructions.

2. Related Art

Integrated circuit microcontrollers have been developed which include arrays of non-volatile memory on the integrated circuit for storing sequences of instructions to be executed by the microcontroller. The sequences of instructions are stored in read-only memory (ROM), which must be programmed during manufacturing of the device, and cannot be updated. In an alternative approach, the instructions are stored in an EPROM array. However, these devices require special hardware to program the EPROM array before the device is placed in the circuit. In yet other systems, EEPROM memory is used for storing instructions. EEPROM has the advantage that it can be programmed much more quickly than EPROM, and can be modified on the fly. In yet another approach, flash memory is used to store instructions, which allows for higher density and higher speed reprogramming of the non-volatile memory. When a device combines a reprogrammable non-volatile memory, such as EEPROM or flash memory with a microcontroller, the device can be reprogrammed while it is in a circuit, allowing in-circuit programming based on interactive algorithms.

The ability to interactively download instruction sets and data to a remote device can be very valuable in a network environment. For example, a company can service a customer's equipment without requiring the customer to bring the equipment to a service center. Rather, the company can execute diagnostic functions using the in-circuit programming capability of the customer's equipment across a communication channel such as the Internet or telephone lines. In this way, software fixes can be downloaded to the customer's equipment, and the equipment can be reenabled with corrected or updated code.

Example prior devices which include this capability include the AT89S8252 microcontroller, manufactured by Atmel of San Jose, Calif., and the P89CE558 single chip microcontroller, manufactured by Philips Semiconductors of Eindhoven, The Netherlands. According to the architecture of the Philips P89CE558 microcontroller, mask ROM is utilized for the in-circuit programming (ICP) set of instructions, which are used by the microcontroller to update flash memory on the chip. Thus, the Philips microcontroller requires a dedicated mask ROM module to store fixed ICP code for each individual environment. In order to adapt the ICP code for a particular environment, the environment must be known before manufacturing of the device is complete so that the mask ROM can be properly coded. Furthermore, the ICP communication channel is fixed to a serial RS232 port in the Philips microcontroller. This limits the use of the microcontroller to a relatively narrow range of applications, and makes it difficult to utilize the ICP function in a dynamic communication environment, where the serial port may not match well with the communication channel across which the updated software is provided.

According to the architecture of the Atmel AT89S8252 microcontroller, a dedicated serial peripheral interface (SPI) port on the chip is used for the updating of flash memory. This SPI port has the disadvantage that it is implemented with inflexible program logic; modification of the in-circuit programming technique cannot be accomplished because of the inflexibility of the SPI port. The Atmel chip has further disadvantages; complicated hardware must be added to the chip for handshaking with the ICP initiator and emulating the erase/program/verify wave forms for the flash memory; the SPI bus is not always the best choice for diverse system applications; extra system logic is required to modify the original reset circuits, which are used by the in-circuit programming algorithms; and complex SPI driver and receiver logic must be attached to the chip.

What is needed is an architecture for in-circuit programming which maintains flexibility in the in-circuit programming process while minimizing the amount of silicon real estate occupied by the flash memory used to implement the in-circuit programming functions.

SUMMARY

The present invention provides an architecture for a microcontroller system on an integrated circuit supporting in-circuit programming. This system maintains flexibility in the in-circuit programming process by storing some of the in-circuit programming (ICP) code in flash memory where it can be easily altered using the in-circuit programming process, and storing portions of the ICP code that do not need to be modified in more space-efficient mask ROM cells on the integrated circuit. In particular, ICP code which handles the communication involved in the in-circuit programming process is stored in flash memory so that it may be easily modified to accommodate a number of different communication formats and protocols. Code to implement the erase, program, and verify portions of the in-circuit programming process are kept in space-efficient mask ROM cells on the integrated circuit.

The flash memory array in the present invention is further simplified by implementing the state machine for the erase, program and verify functions of the flash memory in software stored in mask ROM. Timing functions for the erase, program, and verify functions, which are typically implemented in hardware, are also implemented in software stored in the mask ROM. The design of the flash memory in the present invention is thereby simplified and the amount of silicon real estate occupied by the flash memory is consequently reduced. In this way, the in-circuit programming architecture according to the present invention effectively maintains flexibility in the in-circuit programming system, while reducing requirements for silicon real estate occupied by the in-circuit programming system.

Accordingly, the present invention can be characterized as an apparatus for in-circuit programming of an integrated circuit compromising a processor on the integrated circuit which executes instructions. The integrated circuit includes an external port through which data is received from an external source. The integrated circuit also includes a first memory array comprising non-volatile memory cells for storing instructions for execution by the processor, including instructions for controlling the transfer of additional instructions into the integrated circuit from the external source through the external port. The integrated circuit also contains a second memory array which stores instructions for execution by the processor, including a set of instructions for controlling the in-circuit programming steps of erasing, programming and verifying the instructions in the first memory array.

According to one aspect of the invention, the second memory array comprises a plurality of non-volatile mask ROM cells.

According to another aspect of the present invention, the sequencing of the erase, program and verify operations during the in-circuit programming process is accomplished through software which is stored in mask ROM cells in the second memory array.

According another aspect of the present invention, the timing of the erase, program and verify operations of the in-circuit programming process is accomplished by the processor executing software stored in mask ROM cells in the second memory array.

According to yet another aspect of the present invention, the processor controls the erase, program and verify operations involved in the in-circuit programming process by writing commands to a control register, which is coupled to the first memory array.

According to another aspect of the present invention, the apparatus for in-circuit programming further includes a watch dog timer coupled to the processor, which triggers recovery from deadlock errors during the processor's execution of in-circuit programming instructions.

According to another aspect of the present invention, the external port through which data is received from an external source is configurable to operate as a parallel or a serial port.

According to another aspect of the present invention, the first memory array comprises a plurality of separately erasable blocks of non-volatile memory cells.

According to yet another aspect of the invention, the integrated circuit includes a plurality of ports to external data sources, such as one or more serial ports, one or more parallel ports, and potentially one or more specialized communication ports. The port in the plurality of ports which is used for receiving in-circuit programming instructions from an external source is determined by instructions in the in-circuit programming code itself, and thus can be dynamically altered.

According to another aspect of the invention, the integrated circuit includes a data path for programming and verifying the first memory array and optionally, the second memory array, independent of the in-circuit programming instructions. Thus, using multiplexed I/O pins or the like, original software can be loaded into the device during manufacture or prior to mounting the chip into the system.

Other aspects and advantages of the present invention can be seen upon review of the figures, the description, and the claims which follow.

DESCRIPTION

The following description is presented to enable any person skilled in the art to make and use the invention, and is provided in the context of a particular application and its requirements. Various modifications to the preferred embodiment will be readily apparent to those skilled in the art, and the general principles defined herein may be applied to other embodiments and applications without departing from the spirit and scope of the invention. Thus, the present invention is not intended to be limited to the embodiment shown, but is to be accorded the widest scope consistent with the principles and features disclosed herein.

Figure 1:
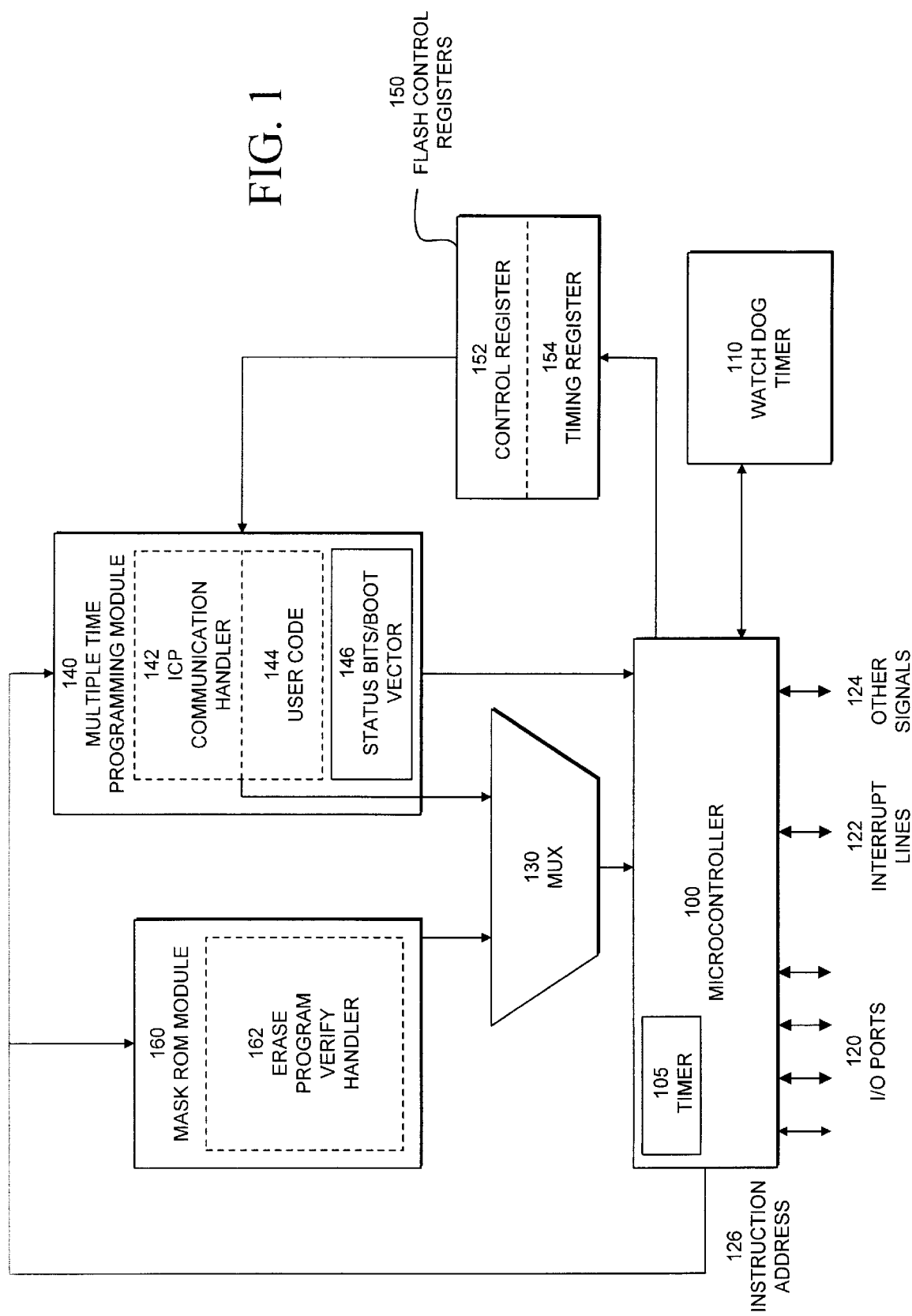
FIG. 1 is a block diagram of a system for in-circuit programming of an integrated circuit in accordance with an aspect of the present invention.

FIG. 1 is a block diagram of a system for in-circuit programming in accordance with an aspect of the present invention. All of the components illustrated in FIG. 1 reside on an integrated circuit. Microcontroller 100 executes instructions from mask ROM module 160 and multiple time programming module 140. Multiple time programming module 140 is a simplified flash memory array which is divided into a plurality of independently erasable blocks of flash memory cells. Multiple time programming module 140 also contains status bits and boot vector 146 which directly connect to microcontroller 100. Multiple time programming module 140 also contains code to implement ICP communication handler 142 as well as user code 144 to implement user-defined functions for microcontroller 100. Microcontroller 100 includes connections to devices external to the integrated circuit through I/O ports 120, interrupt lines 122 and other signals 124. Interrupt lines 122 and other signals 124 are generally used to coordinate and synchronize communications through I/O ports 120. Microcontroller 100 additionally includes timer 105, which implements timing functions for microcontroller 100. Watch dog timer 110 is coupled to microcontroller 100 and is used to detect deadlocks in the operation of microcontroller 100.

Microcontroller 100 issues an instruction address 126 which feeds into address inputs of both mask ROM module 160 and multiple time programming module 140. Instruction address 126 indexes instructions within mask ROM 160 and multiple time programming module 140. Instructions from mask ROM module 160 and multiple time programming module 140 feed through multiplexer (MUX) 130 which selectively switches these instructions into microcontroller 100. Additionally, status bits and boot vector 146, which are part of multiple time programming module 140, feed into microcontroller 100.

In a preferred embodiment of the present invention, the boot vector is not part of the flash memory array within multiple time programming module 140. It is, instead, a separate register within multiple time programming module 140, which is selectively outputted from multiple time programming module 140 when a particular address and particular control signals are inputted in multiple time programming module 140.

Microcontroller 100 controls the operation of multiple time programming module 140 through flash control registers 150. Flash control registers 150, include control register 152 and timing register 154. Microcontroller 100 write control codes to flash control registers 150 to control the erase, program and verify functions of the in-circuit programming process for code within multiple time programming module 140. Control codes for a preferred embodiment of the present invention are illustrated in Tables 1 and 2.

Table 1 contains a listing of the bit patterns which feed onto control register 152 to control erase, program and verify functions for multiple time programming module 140.

TABLE 1

© 1996 Macronix International, Co., Ltd.
FMCON: Flash Module Control register
    FMCON[7:4]: Reserved
    FMCON[3:0]: i.e. MS[3:0] of MTPG2 module
        normal read MTP module at DPTRIPA[15:0] location;
        this is the default value after
    0000: reset
    0001: erase 0–64KB as well as LOCK bits
    0010: block erase; erase 0–16K if DPTR [2:0] = 000
                erase 16–32K if DPTR [2:0] = 010
                erase 32–48K if DPTR [2:0] = 100
                erase 48–56K If DPTR [2:0] = 110
                erase 56–64K if DPTR [2:0] = 111

TABLE 1-continued

0011: program byte at DPTR/PA [15:0] with data =
           FMDATA/DQ[7:0]
    0100: verify erased byte at DPTR/PA [15:0]
    0101: verify programmed byte at DPTR/PA [15:0]
           program lock
    0110: bits,    program LOCK[1] to be 1 if DPTR [1:0] = 00
                    program LOCK[2] to be 1 if DPTR [1:0] = 01
                    program LOCK[3] to be I if DPTR [1:0] = 1x
    0111: verify three programmed lock bits
    1001: erase status bits as well as boot vector
    1010: program status bits or boot vector;
              program SBIT[1:0] if DPTR[0] = 0 with
              FMDATA/DQ[1:0]
              program BVEC[7:0] if DPTR[0] = 1 with
              FMDATA/DQ[7:0]
    1011: verify programmed status bits or boot vector;
               verify SBIT[1:0] if DPTR[0] = 0
              verify BVEC[7:0] if DPTR[0] = 1
    1111: read Manufacture ID or Device ID Table 2 contains a listing of the functions implemented by various bits within timing register 154. By manipulating these bits, microcontroller 100 produces the wave forms required for flash memory erase, program, verify and read operations.

TABLE 2

FMTIM: Flash Module Timing register, used by software to emulate the
    waveform needed for flash operations.
    FMTIM[7]: VPP Enable bit.
    FMTIM[6]: Module Enable bit
    FMTIM[5]: Read Enable bit
    FMTIM[4]: Write Enabie bit
    FMTIM[3:0]: Reserved Mask ROM module 160 contains code to implement erase, program and verify handler 162. This includes code to perform the sequencing and timing of the erasing, programming and verifying operations involved in-circuit programming. A listing of this type of code for a preferred embodiment of the present invention appears in Table 3. Table 3 is an 8051 assembly code listing of subroutines involved in the erasing, programming and verifying functions of the in-circuit programming system.

TABLE 3

```
;© 1996 Macronix International Co., Ltd.
;
; SFR define
            .EQU    FMCON, 0x40H        ; Flash Module CONtrol register
            .EQU    FMTIM, 0x41H        ; Flash Module TIMing register
                                        ; used by s/w to emulate the emulate
                                        ; the waveform needed for flash
                                        operations
            .EQU    delay1, 0xFAH       ; Tck 1/Fosc (ns)
                                        ; delay1 = (256 - 2000/(Tck*12) + 1)
                                        ; delay2 = (500000000/(Tck* 12 *
            .EQU    delay2, 0x1AH       65536)
; Subroutine: Erase full chip
ERASE:
            MOV     FMCON, #00010010b   ; chip erase
            MOV     FMTIM, #11000000b   ; VPP in and CEB is active
            LCALL   DELAY2us            ; delay tVPS or tCES (2us)
            MOV     FMTIM, #11010000b   ; WEB is active
            LCALL   DELAY1s             ; delay tEW (erase time)
            MOV     FMTIM, #11000000b   ; disable WEB
            LCALL   DELAY500ms          ; delay tER (0.5s)
            MOV     FMTIM, #00000000b   ; clear FMTIM
            MOV     FMCON, #00000000b   ; clear FMCON
```

TABLE 3-continued

```
            RET
; Subroutine: Verify erased byte
ERASE_VERIFY:
            MOV     FMCON, #00010010b       ; verify chip erase
            MOV     FMTIM, #11000000b       ; VPP in, CEB is active
            MOV     DFTR, #00H              ; Address
            LCALL   DELAY2us                ; delay tMS (2us)
            MOV     FMTIM, #11100000b       ; OEB is active
            MOV     R1, #00H
            MOV     R0, #00H
            NOP
            NOP
LOOP_E:
; MOVX       A,@DPTR                        ; read Flash
            CJNE    A,#0xFFR, ERASE_FAIL
            INC     DPTR
            DJNZ    R0, LOOP_E
            DJNZ    R1, LOOPE
            MOV     R7, #0xFFH              ; erase verify passed
            SJMP    END_EV
ERASE_FAIL:
            MOV     R7,A                    ; erase verify fail
END_EV:
            MOV     FMTIM, #0000000b        ; clear FMTIM
            MOV     FMCON, #0000000b        ; clear FMCON
            RET
; Subroutine: Program byte
; DPTR: program address
; A: program data
PROGRAM_B:
            MOV     FMCON, #00010001b       ; program byte
            LCALL   PROGRAM
            MOV     FMCON, #00000000b       ; clear FMCON
            RET
; Subroutine Verify Byte
; DPTR: verify address
; A: verify data
VERIFY_B:
            MOV     FMCON, #00010011b       ; verify byte
            MOV     FMTIM, #110000000b      ; VPP in, CEB active
            MOV     B, A
            LCALL   DELAY2us                ; delay tPV(2us)
            MOV     FMTIM, #111100000b      ; OEB is active
            NOP                             ; delay 4 NOP
            NOP
            NOP
            NOP
            CJNE    A, B, VERIFY_B_FAIL
            MOV     R7, #0xFFH              ; verify passed
            SJMP    END_PV
VERIFY_B_FAIL
            MOV     R7, A                   ; program verify fail
END_PV:
            MOV     FMTIM, #00000000b       ; clear FMTIM
            MOV     FMCON, #00000000b       ; clear FMCON
            RET
; Subroutine: Program LOCK bits
; which lock bit being programmed depends on DPTR [2:0]
PROGRAM_L:
            MOV     FMCON, #00010100b       ; program LOCK bit
            LCALL   PROGRAM
            MOV     FMCON, #00000000b       ; clear FMCON
            RET
; Subroutine: Verify LOCK bits
VERIFY_L:
            MOV     FMCON, #00010101b       ; verify three programmed lock bits
            LCALL   VERIFY_L_S
            MOV     FMCON, #00000000b       ; clear FMCON
            RET
; Subroutine: Program Status bit
PROGRAM_S:
            MOV     FMCON, #00010110b       ; program State bit
            LCALL   PROGRAM
            MOV     FMCON, #00000000b       ; clear FMCON
            RET
; Subroutine: Verify programmed status bit
VERIFY_S:
            MOV     FMCON, #00010111b       ; verify state bit
            LCALL   VERIFY_L_S
```

TABLE 3-continued

```
              MOV       FMCON, #00000000b        ; clear FMCON
              RET
; Subroutine: PROGRAM
PROGRAM:
              MOV       FMTIM, #11000000b        ; VPP in, CEB active
              LCALL     DELAY2us                 ; delay tVPS or tCES or tMS (2us)
              MOV       FMTIM, #11010000b        ; WEB is active
              LCALL     DELAY100us               ; delay tPW(100us)
              MOV       FMTIM, #11000000b        ; disable WEB
              LCALL     DELAY2us                 ; delay tPR (2us)
              MOV       FMTIM, #00000000b        ; clear FMTIM
              RET
; Subroutine: Verify LOCK bits or State bit
VERIFY_L S:
              MOV       B, A
              MOV       FMTIM, #01000000b        ; VPP = 5V, CEB active
              LCALL     DELAY2us                 ; delay tVPS or tCES or tMS (2us)
              MOV       FMTIM, #11100000b        ; OEB is active
              NOP
              NOP
              NOP
              NOP
              CJNE      A, B, VERIFY_LS_FAIL
              MOV       R7, #0xFFH               ; verify LOCK or State bit passed
              SJMP      END_VLS
VERIFY_LS_FAIL
:
              MOV       R7, A                    ; verify LOCK or state fail
END_VLS:
              MOV       FMTIM, #00000000b        ; clear FMTIM
              RET
; Subroutine: DELAY2us
DELAY2us:
              PUSH      IE
              CLR       EA
              MOV       TH1, #0xFFH
              MOV       TL1, #delay1
              MOV       TCON, #00H
              MOV       TMOD, #10H               ; TIMER1, MODE 1
              SETB      TR1                      ; start TIMER1
LOOP1:        JNB       TF1,LOOP1
              MOV       TCON, #00H               ; clear TF1 and TR1
              POP       IE
              RET
; Subroutine: DELAY100us
DELAY100us
              MOV       R7, #0x32H
LOOP2:        LCALL     DELAY2us
              DJNZ      R7, LOOP2
              RET
; Subroutine: DELAY500ms
DELAY500ms:
              PUSH      IE
              CLR       EA
              MOV       R7, #delay2
              MOV       TCON, #00H
              MOV       TMOD, #10H               ; TIMER1, MODE 1
LOOP4:        MOV       TH1, #00H
              MOV       TL1, #00H
              SETB      TR1
LOOP3:        JNB       TF1, LOOP3
              MOV       TCON, #00H               ; clear TF1 and TR1
              DJNZ      R7, LOOP4
              POP       IE
              RET
; Subroutine: DELAY1s
DELAY1s:
              LCALL     DELAY500ms
              LCALL     DELAY500ms
              RET
              .END
```

The key insight behind the present invention is that the in-circuit programming code can be divided into two pieces. Portions of the code which are commonly modified, such as the in circuit programming communication handler, which must be reconfigured for each different communication protocol, are stored in flash memory within multiple time programming module 140. Portions of the ICP code which do not have to be modified, specifically erase, program and verify functions which are specifically tailored to the architecture of multiple time programming module 140, are stored in space-efficient mask ROM module 160.

Referring to FIG. 1, the in-circuit programming process operates as follows: microcontroller 100 executes code from ICP communication handler 142, which communicates with an ICP initiator at a remote site across one of I/O ports 120. New instructions to be loaded into the user code section 144 of multiple time programming module 140 are transferred through one of I/O ports 120 into microcontroller 100. Microcontroller 100 executes code in erase/program/verify handler 162 within mask ROM module 160 which loads the new code into user code section 144 of multiple time programming module 140. Microcontroller 100 operates in conjunction with watchdog timer 110, which is used to detect deadlocks in microcontroller 100's execution of the in-circuit programming code. In order to program the new instructions into multiple time programming module 140, microcontroller 100 first erases a portion of multiple time programming module 140 through a sequence of instructions written into control register 152 and timing register 154. Microcontroller 100 then programs the new code into multiple time programming module 140 through additional instructions written into control register 152 and timing register 154. Finally, microcontroller 100 verifies the programming of the new code in multiple time programming module 140 through a sequence of instructions written to control register 152 and timing register 154.

Figure 2:
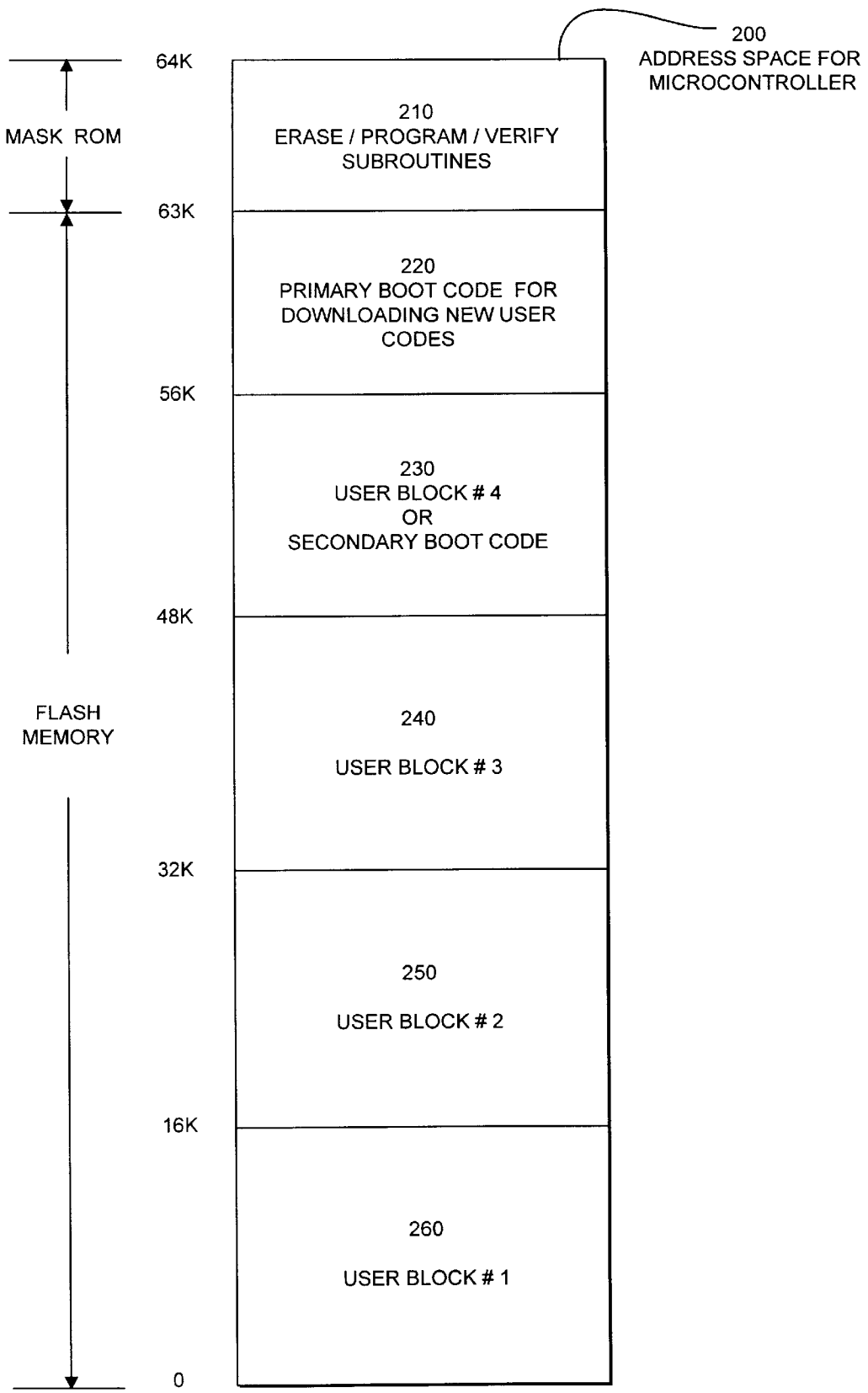
FIG. 2 is a diagram of the address space containing instructions to be executed by microcontroller 100 in accordance with an aspect of the present invention.

FIG. 2 illustrates the address space 200 viewed by microcontroller 100. This address space is divided into a plurality of independently erasable blocks of flash memory as well as a block of mask ROM memory. User block #1 260 extends from address 0 to address 16K. User block #2 250 extends from address 16K to address 32K. User block #3 240 extends from address 32K to address 48K. User block #4 230 extends from address 48K to address 56K. Primary boot code for downloading new user codes 220 is located between addresses 56K and 63K. This primary boot code is used during system boot up for downloading new instructions into user code section 144 of multiple time programming module 140. If this primary boot code space is insufficient, user block #4 230 may be used to store secondary boot code.

The address space between 63K and 64K contains erase/program/verify subroutines 210. This portion of address space 200 is located within mask ROM module 160. The other portion of address space 200 from 0 to 63K is located in flash memory cells in multiple time programming module 140. Although these two portions of address space 200 reside within different memory modules, they comprise portions of a single address space 200 for microcontroller 100. Instructions from mask ROM module 160 and multiple time programming module 140 are selectively switched into microcontroller 100 through MUX 130.

In the embodiment illustrated in FIG. 1, only a single mask ROM module 160 and a single multiple time programming module 140 are illustrated. Alternative systems include more than one mask ROM module and more than one module of flash memory cells, allowing even greater flexibility in the design and implementation of in-circuit programming instructions.

Figure 3:
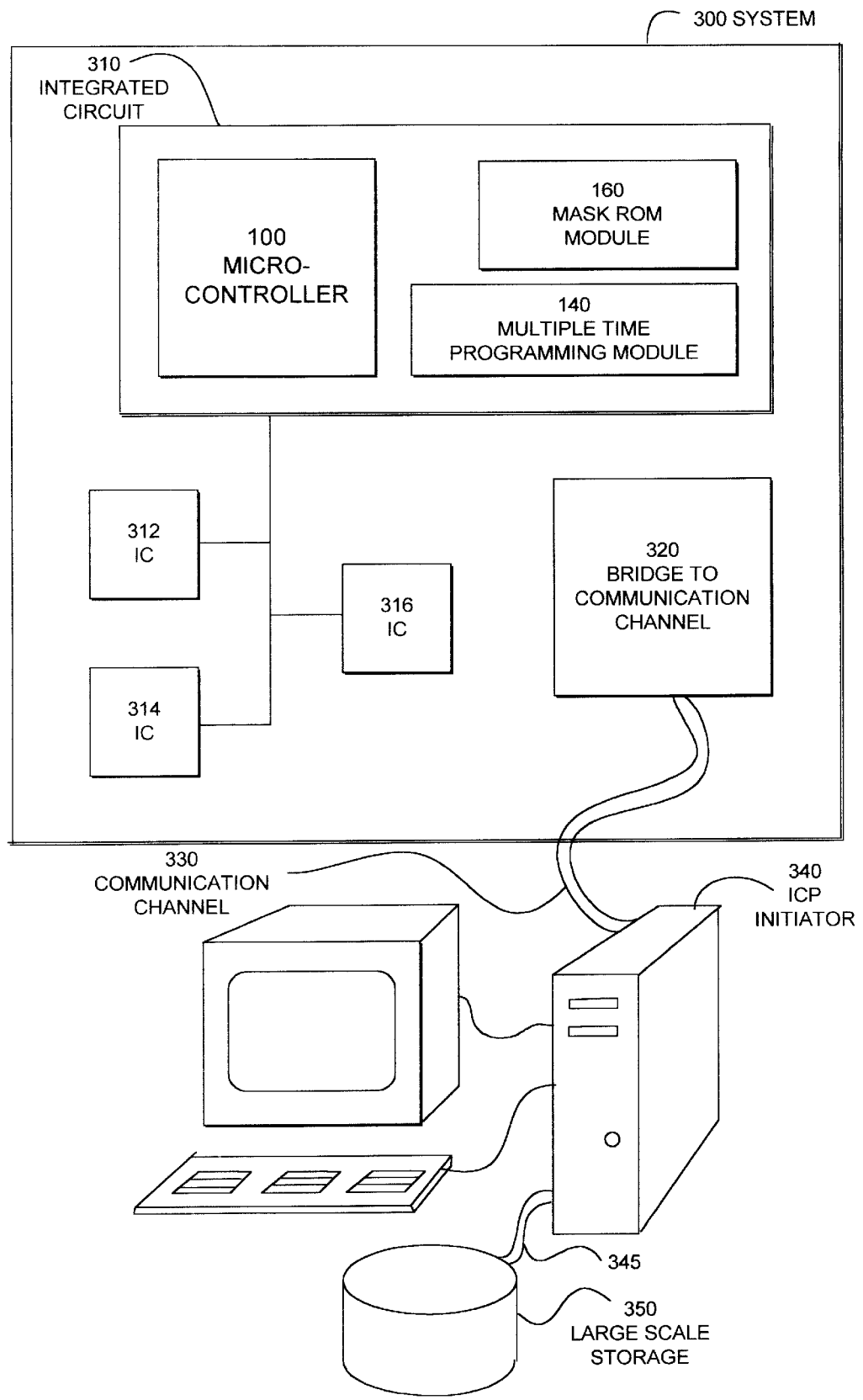
FIG. 3 is a diagram showing how the present invention is integrated into a system including a communication channel and an in-circuit programming initiator 340 in accordance with an aspect of the present invention.

FIG. 3 illustrates the application environment for the present invention The invention is implemented on an integrated circuit 310, which is placed within system 300; system 300 comprises either a printed circuit board or some other system implementation. Integrated circuit 310 includes microcontroller 100, mask ROM module 160, and multiple time programming module 140 as well as the other components of the ICP system illustrated in FIG. 1. Microcontroller 100 is coupled to a plurality of integrated circuits (ICs) 312, 314 and 316. Bridge to communication channel 320 provides a channel across which in-circuit programming code is transferred. Bridge to communication channel 320 may comprise a simple network port, or may include extra glue logic to make the ICP system transparent to non-ICP code.

The functionality of bridge to communication channel 320 can be modified, allowing bridge to communication channel 320 to be coupled to diverse ICP communication channels having different levels of data rates, error rates and complexity. For example, in one embodiment communication channel 330, comprises an Internet executing an Internet communication protocol.

Bridge to communication channel 320 is coupled through communication channel 330 to an ICP initiator 340, such as a personal computer or workstation. ICP initiator 340 is coupled by a communication channel 345 to large scale storage device 350. ICP initiator 340 can be coupled to microcontroller 100 in a variety of ways. In one embodiment, an ICP initiator 340 is a world wide web site accessed through the Internet on communication channel 330. Alternatively, ICP initiator 340 acts as the initiator across a dial-up modem link. In yet another embodiment, communication channel 330 is a communication bus in a personal computer system, and the in-circuit software is loaded across the bus 330. In this embodiment, upgrades to system 300 can be distributed to end users on floppy disks or otherwise loaded through ICP initiator 340.

In some applications, bridge to communication channel 320 is not required. Referring to FIG. 1, in some applications the software contained within ICP communication handler 142 is sufficient by itself to implement the proper protocol for ICP communications through one of I/O ports 120 across communication channel 330. This allows one of I/O ports 120 to directly connect to communication channel 330, thereby eliminating the need for bridge to communication channel 320.

Figure 4A:
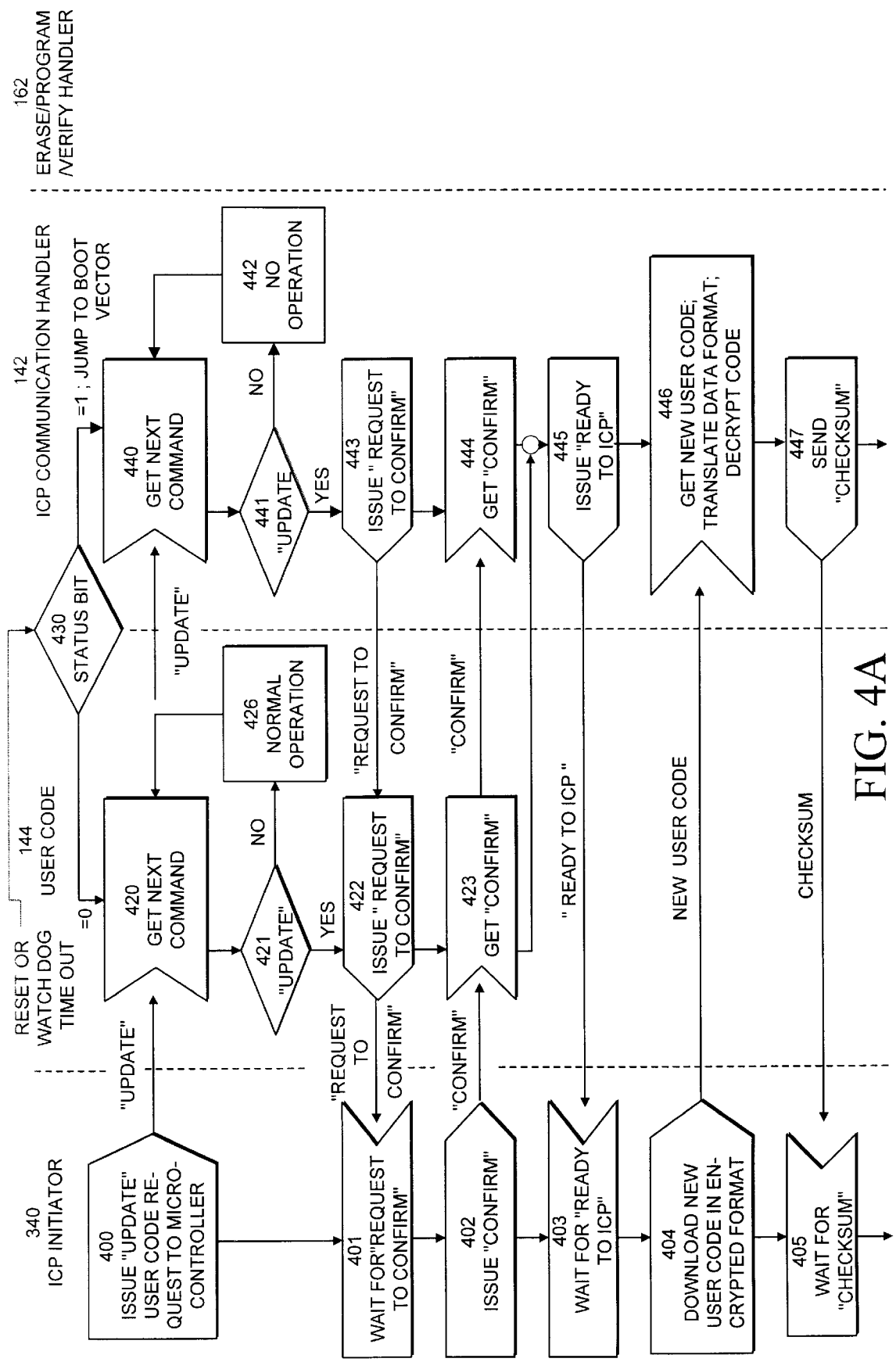
FIG. 4A is the first portion of a flow chart of the in-circuit programming process in accordance with an aspect of the present invention.
Figure 4B:
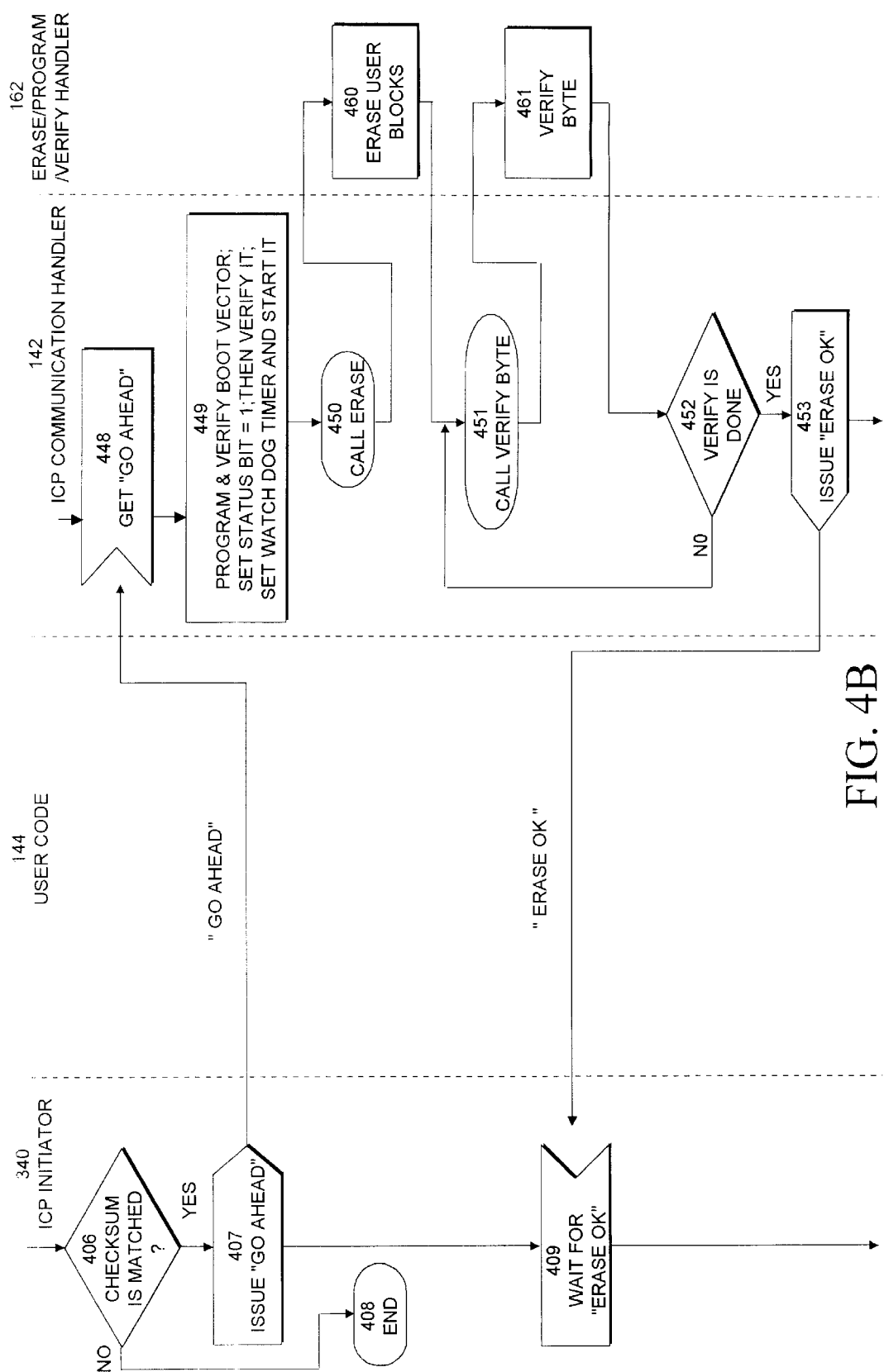
FIG. 4B is a second portion of a flow chart of the in-circuit programming process in accordance with an aspect of the present invention.
Figure 4C:
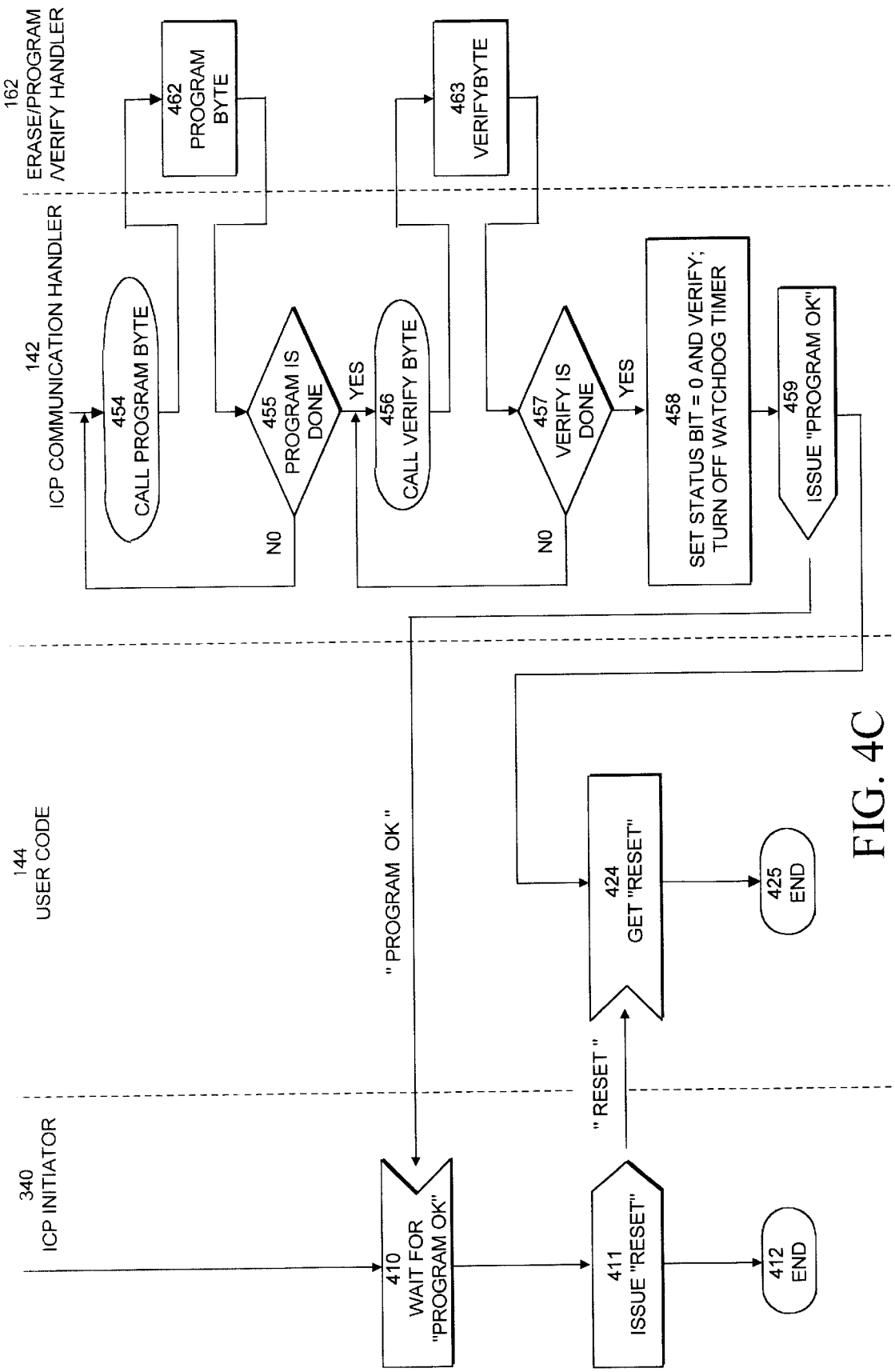
FIG. 4C is the third portion of a flow chart of the in-circuit programming process in accordance with an aspect of the present invention.

FIGS. 4A, 4B and 4C contain a flowchart of the operations involved in the in-circuit programming process. Each of the FIGS. 4A, 4B and 4C are divided into four columns. The first column, labeled "ICP Initiator 340," represents the activities of in-circuit programming initiator 340, which is illustrated in FIG. 3. ICP initiator 340 is a device external to integrated circuit 310 which is connected to in-circuit programming systems 300 through a communication channel 330. ICP initiator 340 initiates and controls the in circuit programming process.

The remaining three columns of FIGS. 4A, 4B and 4C represent actions of microcontroller 100 in executing different bodies of code stored within mask ROM module 160 and multiple time programming module 140. The column labeled "user code 144" represents activities of microcontroller 100 while executing user code 144 within multiple time programming module 140. The column labeled "ICP communication handler 142" represents the actions of microcontroller 100 while executing ICP communication handler 142 within multiple time programming module 140. The column labeled "erase/program/verify handler 162" represents the actions of microcontroller 100 while executing erase/program/verify handler 162 within mask ROM module 160.

The in-circuit programming process as illustrated in FIGS. 4A, 4B and 4C operates as follows. Upon system reset or when watchdog timer 110 times out, microcontroller 110 enters state 430 wherein a status bit is checked. If the status bit is zero, microcontroller 100 enters step 420 within user code 144. If the status bit is set to a one, microcontroller 100 jumps to the location pointed to by the boot vector and executes step 440 within ICP communication handler 142.

At step 420, microcontroller 100 waits to get the next command from ICP initiator 340. When ICP initiator 340 executes step 400, it transmits an update command to microcontroller 100. This update command is received by microcontroller 100, causing it to proceed to step 421. Step 421, microcontroller 100 asks whether the command received was an update command. If not, microcontroller 100 proceeds to step 426, in which normal operation of microcontroller 100 takes place, and microcontroller 100 executes non-ICP user code. The system then returns to step 420 to get the next command. If the command was an update command, microcontroller 100 proceeds to step 422, in which a "request to confirm" is sent to ICP initiator 340. After executing step 400, ICP initiator 340 proceeds to step 401 in which ICP initiator 340 waits for a request to confirm. When the request to confirm command is received, ICP initiator 340 proceeds to step 402, in which a confirm command is transmitted to microcontroller 100. Microcontroller 100 receives this confirm command at step 423, and proceeds to step 445 within ICP communication handler 142, in which microcontroller 100 transmits a ready to ICP command to ICP initiator 340. After issuing the confirm command, ICP initiator 340 proceeds to step 403, where ICP initiator 340 waits for a ready to ICP command from microcontroller 100.

If at step 430, the status bit was set to one, microcontroller 100 executes a set of steps to confirm the ICP request within ICP communication handler 142. These steps almost precisely mirror the steps used to confirm the ICP request within user code 144 when the status bit was set to zero. At step 440, microcontroller 100 waits for the next command from ICP initiator 340. When ICP initiator 340 executes step 400, it transmits an update command to microcontroller 100. When this update command is received by microcontroller 100 at step 440, microcontroller 100 proceeds to step 441 in which microcontroller 100 determines whether the command was an update command. If not, microcontroller 100 proceeds to step 442 in which no operation (a NOOP) takes place. Microcontroller 100 then returns to step 440 to receive another command.

If microcontroller 100 received an update command at step 441, it proceeds to step 443 in which microcontroller 100 transmits a request to confirm command to ICP initiator 340. After ICP initiator 340 executes step 400, it proceeds to step 401 where it waits for a request to confirm command. Upon receiving the request to confirm command from microcontroller 100, ICP initiator 340 proceeds to step 402 where it transmits a confirm command to microcontroller 100. After executing step 443, microcontroller 100 proceeds to step 444 where it waits for the confirm command from ICP initiator 340. Upon receiving the confirm command, microcontroller 100 proceeds to step 445 in which microcontroller 100 transmits a "ready to ICP" command to the ICP initiator 340. After executing step 402, ICP initiator 340 proceeds to step 403, where it waits for a ready to ICP command from microcontroller 100.

At this point, the confirmation process for the ICP command is complete and the downloading of the new user code takes place. After executing step 403, ICP initiator 340 proceeds to step 404, wherein ICP initiator 340 downloads the new user code in encrypted format across communication channel 330 to microcontroller 100. At step 446, microcontroller 100 receives the new user code, and decrypts the data format. After executing 446, microcontroller 100 proceeds to step 447, in which it sends a checksum to ICP initiator 340. After executing 404, ICP initiator 340 proceeds to step 405 where it waits for the checksum. After receiving the checksum, ICP initiator 340 proceeds to step 406 in which it verifies whether the checksum matches the checksum of the code that was sent to microcontroller 100. If the checksum does not match, ICP initiator 340 proceeds to step 408, which is an end state, and an error is flagged. If the checksum matches, ICP initiator 340 proceeds to step 407 in which it issues a go ahead command. After sending the checksum at step 447, microcontroller 100 proceeds to step 448 in which it waits for the go ahead command.

Upon receiving the go ahead command from ICP initiator 340, microcontroller 100 proceeds to step 449 in which the in-circuit programming commences. At step 449, microcontroller 100 programs and verifies the boot vector and sets the status bit to 1 indicating that an ICP operation is taking place. Microcontroller 100 then verifies that the status bit is set, and proceeds to set and start watchdog timer 110. Microcontroller 100 then proceeds to step 450 in which it calls the erase subroutine from erase/program/verify handler 162. Microcontroller 100 then proceeds to step 460 in erase/program/verify handler 162, in which microcontroller 100 erases the specified blocks within multiple time programming module 140. Microcontroller 100 then proceeds to step 451 within ICP communication handler 142.

At step 451, microcontroller 100 calls the verify byte subroutine from erase/program/verify handler 162. Microcontroller then proceeds to step 461 in which the verify byte subroutine is executed. Microcontroller 100 then proceeds to step 452 within ICP communication handler 142. At step 452, microcontroller 100 determines whether or not the verification of the erase operation is complete. If not, microcontroller 100 returns to step 451 to verify the subsequent byte. If so, microcontroller 100 proceeds to step 453 in which microcontroller 100 transmits an erase OK command to ICP initiator 340. After executing step 407, ICP initiator 340 proceeds to step 409 in which ICP initiator 340 waits for an erase OK command. After receiving the erase OK command, ICP initiator 340 proceeds to step 410 where ICP initiator 340 waits for a program OK command from microcontroller 100.

After issuing the erase OK command at step 453, microcontroller 100 proceeds to step 454 in which microcontroller 100 calls the program byte subroutine from erase/program/verify handler 162. Microcontroller 100 then proceed to step 462 in which the program byte subroutine is executed. Microcontroller 100 next advances to step 455 within ICP communication handler 142. At step 455, microcontroller 100 determines whether the programming is finished. If not, microcontroller 100 returns to step 454 to call the program byte command for the subsequent byte to be programmed. If the programming is complete, microcontroller 100 proceeds to step 456 in which the verify byte subroutine is called. Microcontroller 100 then proceeds to the verify byte subroutine at step 463 within erase/program/verify handler 162. At step 463, the verify byte subroutine is executed. Microcontroller 100 then proceeds to step 457 within ICP communication handler 142. At step 457, microcontroller 100 determines whether the verify operation is complete. If not, microcontroller 100 returns to step 456, where the verify byte subroutine is called for a subsequent byte to be verified. If the verification operation is complete, microcontroller 100 proceeds to step 458.

At step 458, the erase, program and verify operations for the in-circuit programming are complete. Microcontroller 100 sets the status bit to 0 and verifies that it is set to 0. It then turns off watchdog timer 110. Microcontroller 100 then proceeds to step 459 in which it issues a program OK command to ICP initiator 340. ICP initiator 340 receives the program OK command at step 410 and proceeds to step 411 in which ICP initiator 340 transmits a reset command to microcontroller 100. After issuing the program OK command at step 459, microcontroller 100 proceeds to step 424 within user code 144 in which it waits for a reset command. When a reset command is received from ICP initiator 340, microcontroller 100 proceeds to step 425 which is an end state. After issuing the reset command at step 411, ICP initiator 340 proceeds to step 412 which is also an end state. At this point the in-circuit programming process is complete. This process will be repeated when a new in-circuit programming process is initiated by ICP initiator 340.

Using the architecture illustrated in FIG. 1, designers of systems can adapt the in-circuit programming code to their particular environment. Thus, a manufacturer selects an integrated circuit, as shown in FIG. 1, for implementation in their circuit. If the in-circuit programming code is not ready, microcontroller 100 is utilized and the variety of communication ports available on the chip 300 are used to minimize the extra logic required on the circuit board to match the system to a particular in-circuit programming environment. First, the proper connections and protocol for in-circuit programming are selected by the designer. Next, the ICP code for the selected environment is developed and improved. The ICP code is then integrated with the programs to be executed during normal operation of the system. Next, the integrated ICP code and user code are stored in the flash memory of multiple time programming module 140. Then, the erase and program operations are verified. Microcontroller 110, including the integrated ICP code, is then placed inside the system. Next, the ICP code is executed and tested. If the system works well, the system is mass produced. If the ICP code needs modification, then the ICP process is repeated to optimize the ICP code. Similarly, the system code is optimized using the same programming techniques. The end user of the system thus obtains robust in-circuit programming code embedded in microcontroller 100, which can be updated and modified on the fly using the interactive in-circuit programming techniques according to the present invention.

CONCLUSION

Accordingly, the present invention provides a flexible flash memory-based microcontroller architecture which allows for diverse in-circuit programming applications. For example, televisions or video monitors, digital video disks or CD-ROMs, remote control devices or mobile telephones may include microcontrollers with in-circuit programming structures according to the present invention. Various sources of updated ICP code can then be loaded into respective devices using the flexible architecture of the present invention. The present invention can be thereby modified or adapted for a particular application environment. Very little or no glue logic is required in order to support the in-circuit programming structures. Furthermore, the power of the microcontroller associated with the in-circuit programming can be leveraged to simplify the design of flash memory for the in-circuit programming system.

Silicon real estate on the integrated circuit is conserved by storing integrated circuit-specific portions of the ICP code, which are not likely to change, in space efficient mask ROM cells. Other parts of the ICP code, such as the communication handler, which are likely to be modified frequently are maintained in flash memory. In this way, silicon real estate can be saved while maintaining the flexibility to tailor the in-circuit programming system for a wide variety of different applications.

The foregoing description of the preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

What is claimed is:

1. An apparatus for in-circuit programming of an integrated circuit, comprising:

a processor on the integrated circuit which executes instructions;

an external port on the integrated circuit through which data is received from an external source;

a first memory array comprising non-volatile memory cells on the integrated circuit, which stores instructions for execution by the processor, including a set of instructions for controlling the transfer of instructions into the integrated circuit from the external source through the external port; and a second memory array on the integrated circuit, which stores instructions for execution by the processor, including a set of instructions for controlling the in-circuit programming steps of erasing, programming and verifying the instructions in the first memory array.

2. The apparatus for in-circuit programming of claim 1, wherein the non-volatile memory cells in the first memory array comprise a plurality of floating gate memory cells.

3. The apparatus for in-circuit programming of claim 1, wherein the second memory array comprises a plurality of non-volatile memory cells.

4. The apparatus for in-circuit programming of claim 1, wherein the second memory array comprises a plurality of mask ROM cells.

5. The apparatus for in-circuit programming of claim 1, wherein the second memory array comprises a plurality of floating gate memory cells.

6. The apparatus for in-circuit programming of claim 1, wherein the sequencing of the erasing, programming and verifying operations for the first memory array is controlled by a set of instructions executed by the processor.

7. The apparatus for in-circuit programming of claim 1, wherein the sequencing of the erasing, programming and verifying operations for the first memory array is controlled by a set of instructions executed by the processor and stored in mask ROM cells in the second memory array.

8. The apparatus for in-circuit programming of claim 6, wherein the processor controls the erasing, programming and verifying operations for the first memory array through a control register coupled to the first memory array.

9. The apparatus for in-circuit programming of claim 1, wherein timing of the erasing, programming and verifying operations for the first memory array is controlled by a timer function included in the processor.

10. The apparatus for in-circuit programming of claim 1, wherein timing of the erasing, programming and verifying operations for the first memory array is controlled by a set of instructions executed by the processor.

11. The apparatus for in-circuit programming of claim 1, wherein timing of the erasing, programming and verifying operations for the first memory array is controlled by a set of instructions executed by the processor and stored in mask ROM cells in the second memory array.

12. The apparatus for in-circuit programming of claim 1, further including a watch dog timer coupled to the processor which triggers recovery from errors during the processor's execution of the in-circuit programming instructions.

13. The apparatus for in-circuit programming of claim 1, wherein the first memory array comprises a plurality of separately erasable blocks of non-volatile memory cells.

14. The apparatus for in-circuit programming of claim 1, wherein the external port comprises a serial port.

15. The apparatus for in-circuit programming of claim 1, wherein the external port comprises a parallel port.

16. The apparatus for in-circuit programming of claim 1, wherein the external port is configurable to operate as a parallel port or a serial port.

17. The apparatus for in-circuit programming of claim 1, including a plurality of ports to external data sources, and wherein the port in the plurality of ports used for the external port is determined by instructions in the set of instructions for controlling the in-circuit programming steps.

18. An apparatus for in-circuit programming of an integrated circuit, comprising:
    a processor on the integrated circuit which executes instructions;
    an external port on the integrated circuit through which data is received from an external source;
    a first memory array comprising floating gate memory cells on the integrated circuit, which stores instructions for execution by the processor, including a set of instructions for controlling the transfer of instructions into the integrated circuit from the external source through the external port;
    a second memory array comprising mask ROM cells on the integrated circuit, which stores instructions for execution by the processor, including a set of instructions for controlling, sequencing and timing of the in-circuit programming steps of erasing, programming, and verifying the instructions in the first memory array; and
    a control register coupled to the first memory array through which the processor controls the erasing, programming, and verifying in the first memory array.

19. The apparatus for in-circuit programming of claim 18, further including a watch dog timer coupled to the processor which triggers recovery from errors during the processor's execution of the in-circuit programming instructions.

20. The apparatus for in-circuit programming of claim 18, wherein the first memory array comprises a plurality of separately erasable blocks of non-volatile memory cells.

21. The apparatus for in-circuit programming of claim 18, wherein the external port comprises a serial port.

22. The apparatus for in-circuit programming of claim 18, wherein the external port comprises a parallel port.

23. The apparatus for in-circuit programming of claim 18, wherein the external port is configurable to operate as a parallel port or a serial port.

24. The apparatus for in-circuit programming of claim 18, including a plurality of ports to external data sources, and wherein the port in the plurality of ports used for the external port is determined by the instructions in the set of instructions for controlling the in-circuit programming steps.

25. In an integrated circuit including a processor and an external port, a method for in-circuit programming of the integrated circuit, comprising:
    providing on the integrated circuit a first memory array comprising non-volatile memory cells, and a second memory array;
    receiving an in-circuit program command from an initiator external to the integrated circuit;
    in response to the in-circuit program command, using the processor to execute a set of instructions for controlling the in-circuit programming steps of erasing, programming and verifying instructions in the first memory array; and
    using the processor to execute a set of instructions from the first memory array to control the transfer of a set instructions into the integrated circuit from an external source through the external port.

26. The method for in-circuit programming of the integrated circuit of claim 25, wherein the set of instructions for controlling the in-circuit programming steps of erasing, programming and verifying instructions in the first memory array is stored in the second memory array.

27. The method for in-circuit programming of the integrated circuit of claim 25, wherein the non-volatile memory cells in the first memory array comprise floating gate memory cells.

28. The method for in-circuit programming of the integrated circuit of claim 25, wherein the second memory array comprises a plurality of mask ROM cells.

29. The method for in-circuit programming of the integrated circuit of claim 25, wherein the second memory array comprises a plurality of non-volatile memory cells.

30. The method for in-circuit programming of the integrated circuit of claim 25, wherein the second memory array comprises a plurality of floating gate memory cells.

31. The method for in-circuit programming of the integrated circuit of claim 25, wherein the step of using the processor to execute a set of instructions for controlling the in-circuit programming steps of erasing, programming and verifying instructions includes controlling the sequencing of the erasing, programming and verifying operations.

32. The method for in-circuit programming of the integrated circuit of claim 25, wherein the processor controls the erasing, programming and verifying operations for the first memory array through a control register coupled to the first memory array.

33. The method for in-circuit programming of the integrated circuit of claim 25, wherein timing of the erasing, programming and verifying operations for the first memory array is controlled by a timer function included in the processor.

34. The method for in-circuit programming of the integrated circuit of claim 25, wherein the step of using the processor to execute a set of instructions for controlling the in-circuit programming steps of erasing, programming and verifying instructions includes controlling the timing of the erasing, programming and verifying operations.

35. The method for in-circuit programming of the integrated circuit of claim 25, including the step of providing a watch dog timer coupled to the processor which triggers recovery from errors during the processor's execution of the in-circuit programming instructions.

36. The method for in-circuit programming of the integrated circuit of claim 25, wherein the first memory array comprises a plurality of separately erasable blocks of non-volatile memory cells.

37. The method for in-circuit programming of the integrated circuit of claim 25, wherein the external port comprises a serial port.

38. The method for in-circuit programming of the integrated circuit of claim 25, wherein the external port comprises a parallel port.

39. The method for in-circuit programming of the integrated circuit of claim 25, wherein the external port is configurable to operate as a parallel port or a serial port.

40. The method for in-circuit programming of the integrated circuit of claim 25, wherein the integrated circuit further includes a plurality of ports to external data sources, and further including the step of determining the port in the plurality of ports used for the external port by using the processor to execute instructions in the set of instructions for controlling the in-circuit programming steps.

41. An apparatus for in-circuit programming of an integrated circuit, comprising:

a processor on the integrated circuit which executes instructions;

an external port on the integrated circuit through which data is received from an external source;

a first memory array comprising electrically programmable non-volatile memory cells on the integrated circuit, which stores instructions for execution by the processor, including a set of instructions for controlling the transfer of instructions into the integrated circuit from the external source through the external port; and a second memory array comprising read only memory (ROM) on the integrated circuit, which stores instructions for execution by the processor, including a set of instructions for controlling the in-circuit programming steps of erasing, programming and verifying the instructions in the first memory array.

42. The apparatus for in-circuit programming of claim 41, wherein the nonvolatile memory cells in the first memory array comprise a plurality of floating gate memory cells.

43. The apparatus for in-circuit programming of claim 41, wherein the second memory array comprises a plurality of mask ROM cells.

44. The apparatus for in-circuit programming of claim 41, wherein the sequencing of the erasing, programming and verifying operations for the first memory array is controlled by a set of instructions executed by the processor and stored in mask ROM cells in the second memory array.

45. The apparatus for in-circuit programming of claim 41, wherein timing of the erasing, programming and verifying operations for the first memory array is controlled by a set of instructions executed by the processor and stored in mask ROM cells in the second memory array.

46. The apparatus for in-circuit programming of claim 41, wherein the first memory array comprises a plurality of separately erasable blocks of non-volatile memory cells.

47. The apparatus for in-circuit programming of claim 41, wherein the external port comprises a serial port.

48. The apparatus for in-circuit programming of claim 41, wherein the external port comprises a parallel port.

* * * * *